May 13, 1952 W. W. WIERSIG 2,596,633
MOTOR DRIVE UNIT FOR COMBINES
Filed Nov. 27, 1945 6 Sheets-Sheet 1
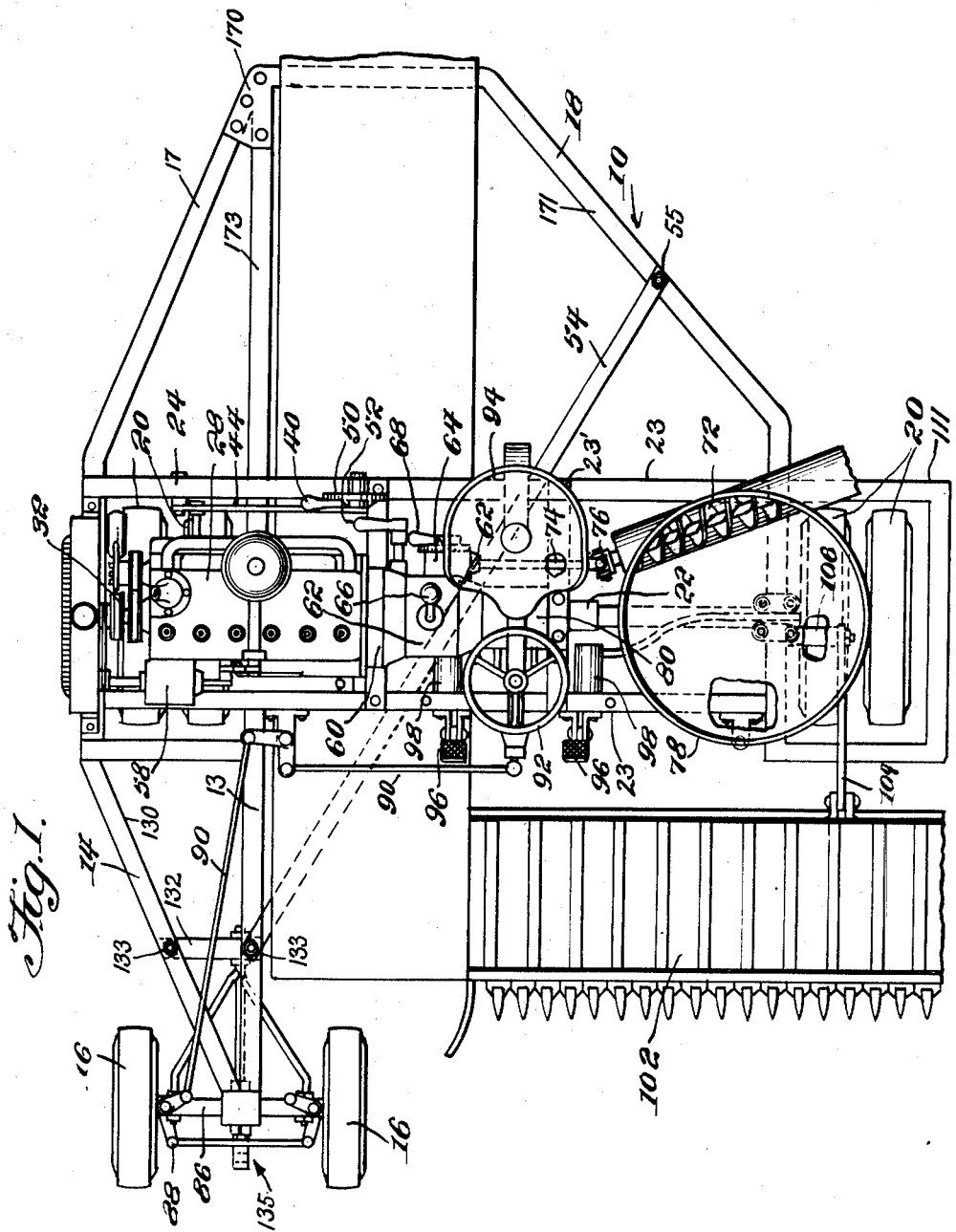
INVENTOR.
Walter W. Wiersig,
BY Victor J. Evans & Co.
ATTORNEYS

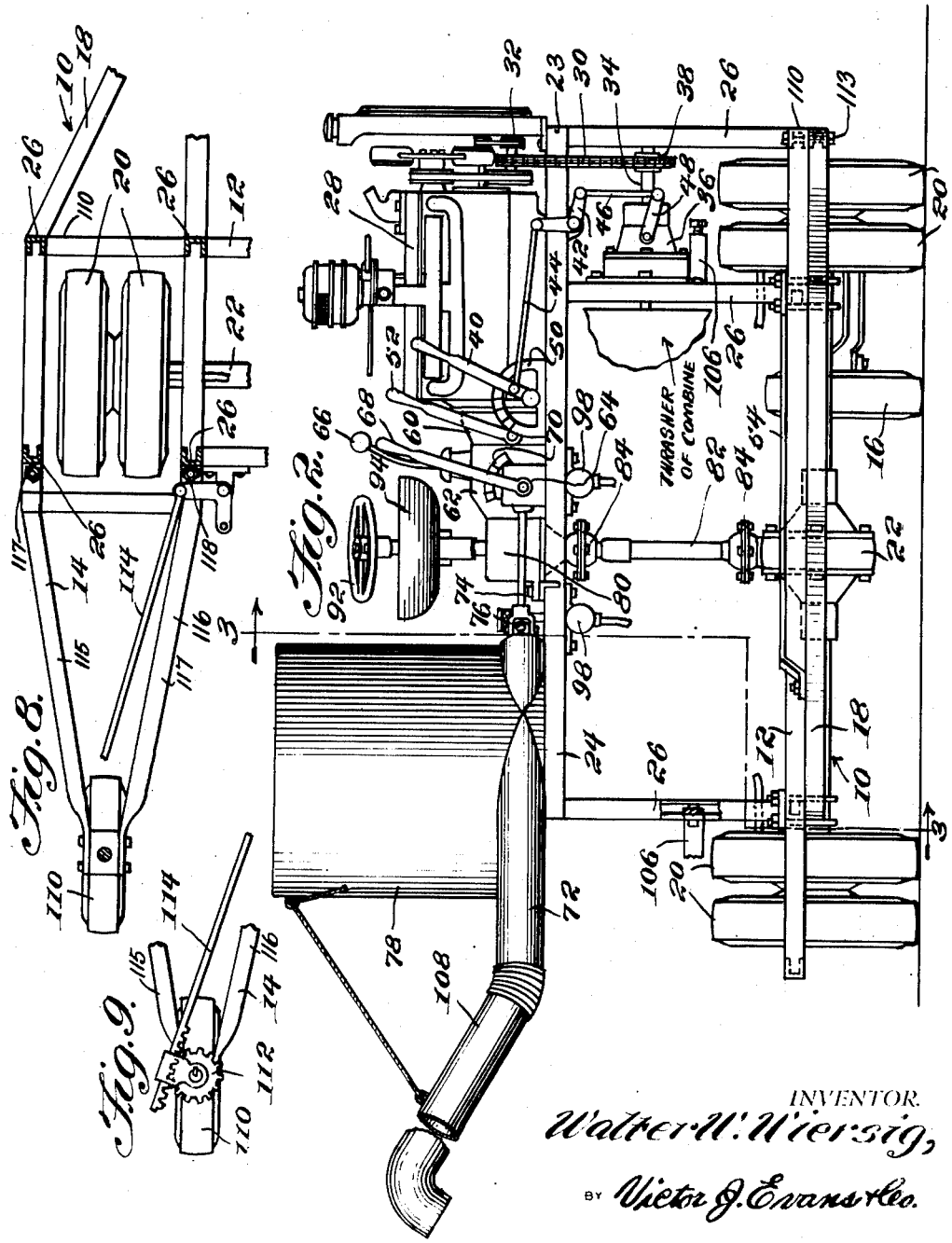

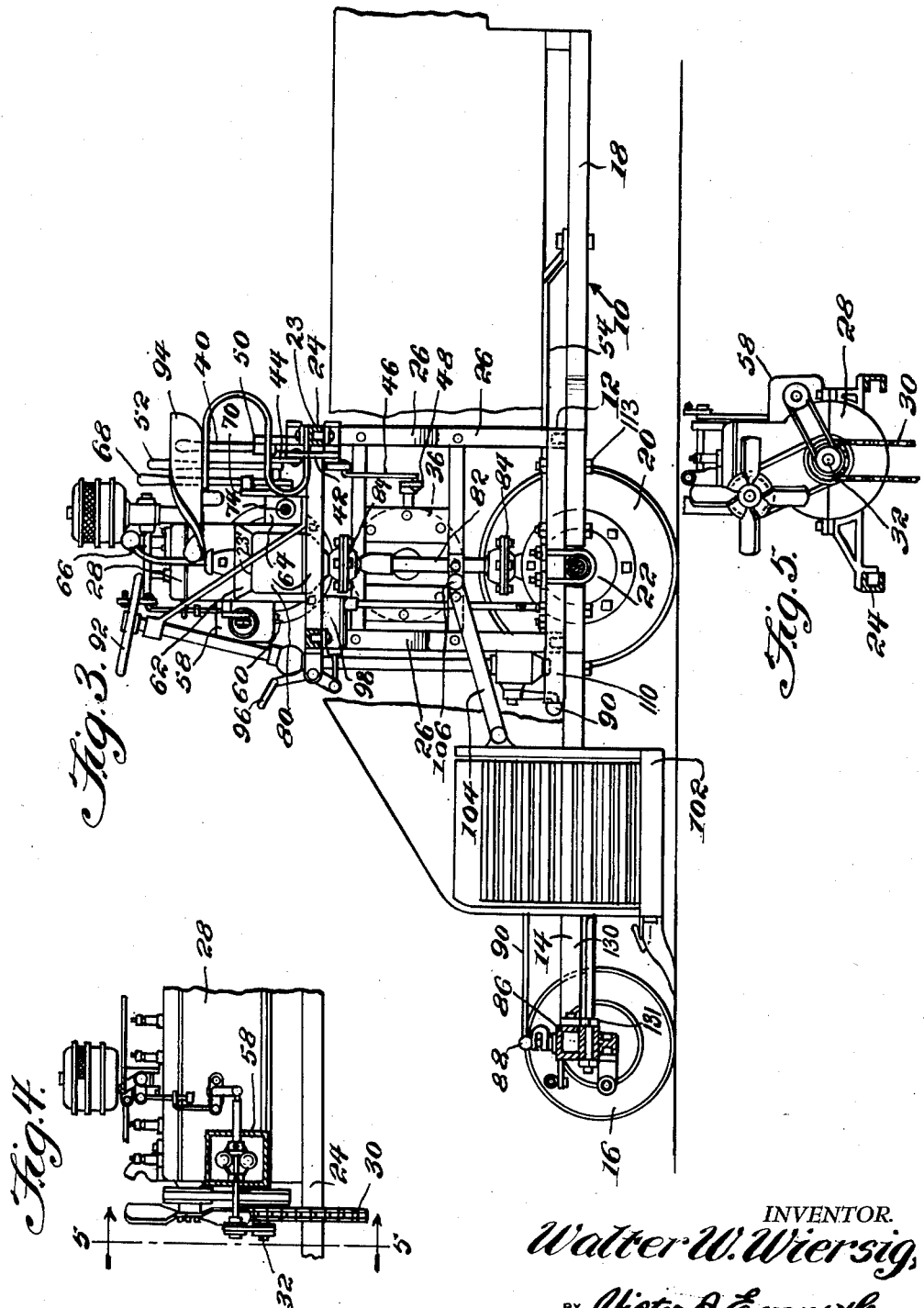

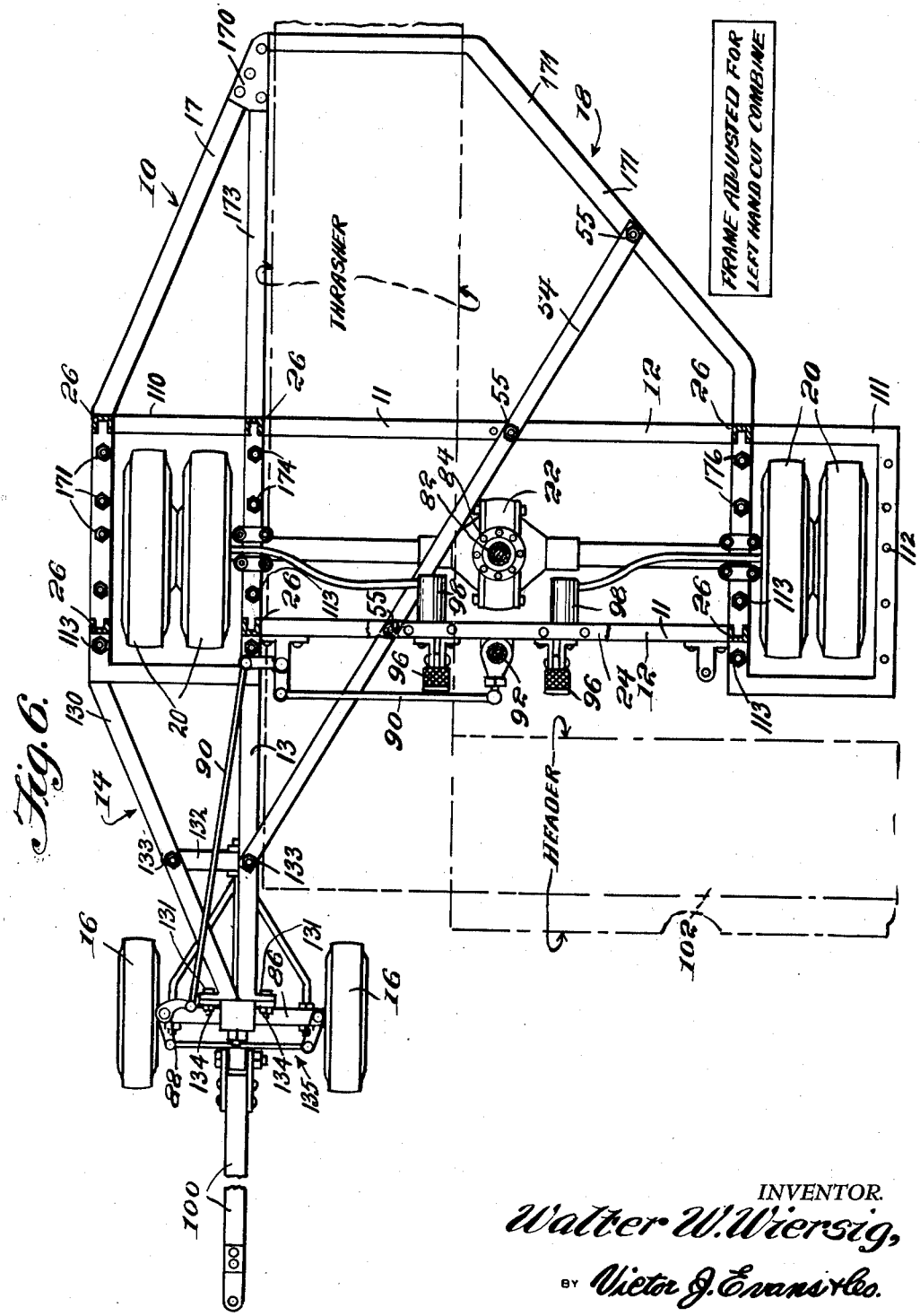

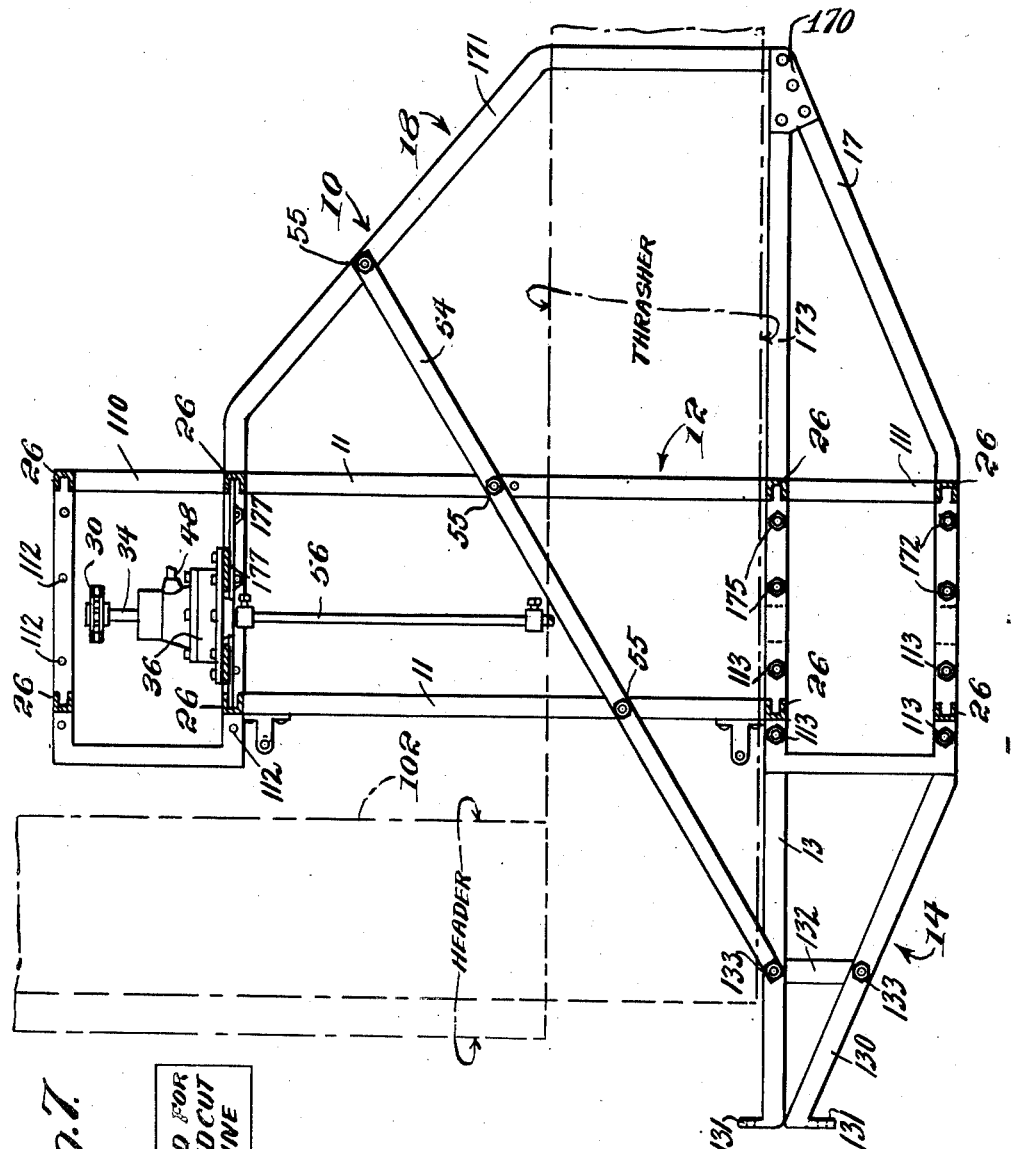

May 13, 1952     W. W. WIERSIG     2,596,633
MOTOR DRIVE UNIT FOR COMBINES
Filed Nov. 27, 1945     6 Sheets-Sheet 6
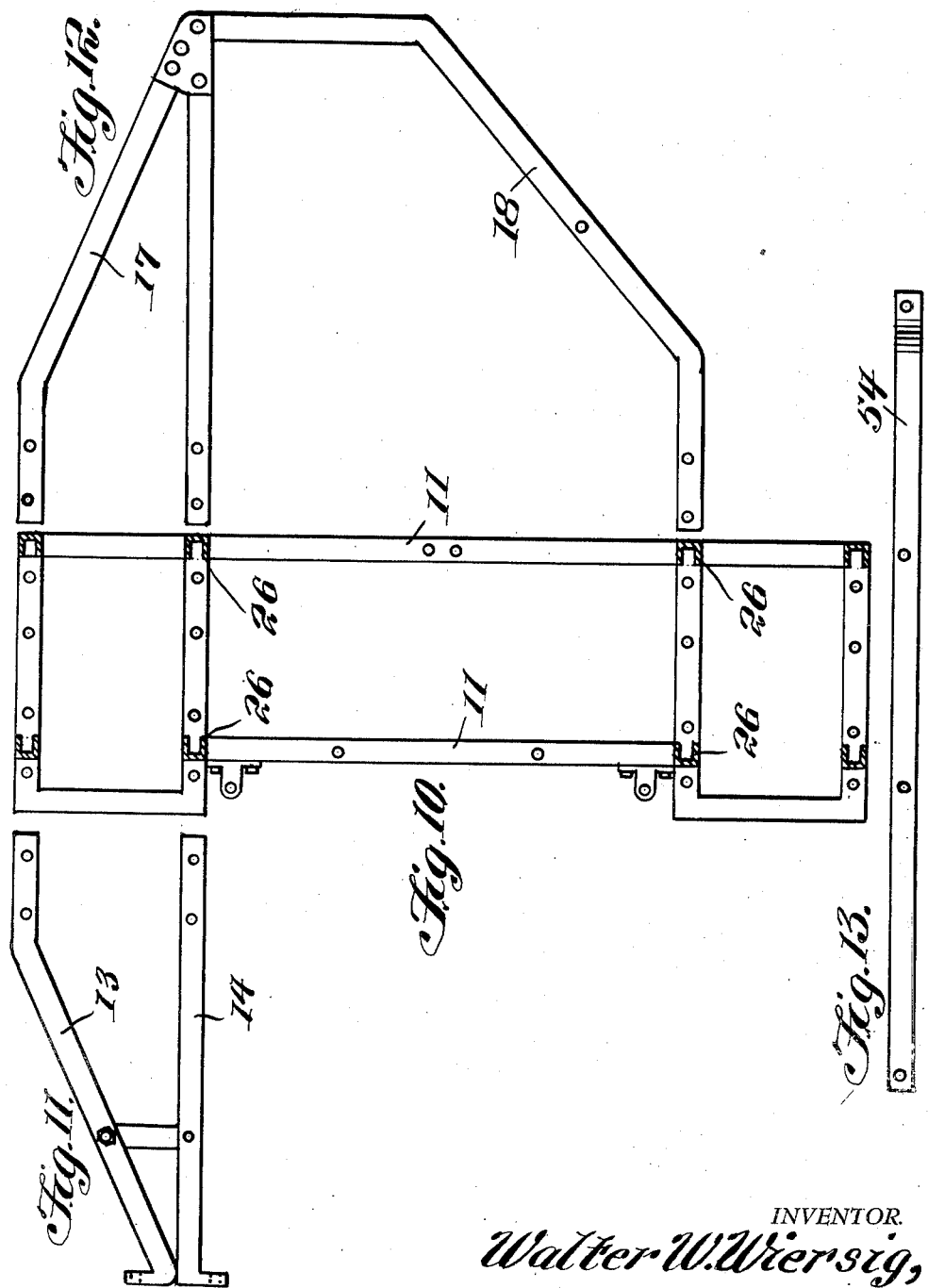
INVENTOR.
Walter W. Wiersig,
BY Victor J. Evans & Co.
ATTORNEYS Patented May 13, 1952

2,596,633

UNITED STATES PATENT OFFICE 2,596,633

MOTOR DRIVE UNIT FOR COMBINES

Walter W. Wiersig, Alva, Okla.

Application November 27, 1945, Serial No. 631,046

1 Claim. (Cl. 180—27)

This invention relates to a unit for propelling and driving combine harvesters.

An object of this invention is to provide a device that is simple, efficient and can be economically manufactured, since the parts used to complete the assembly are standard motor truck parts with only minor alterations.

Due to the simple design of the device, retooling is not necessary to manufacture the device.

A still further object of the invention is to provide a motor drive unit for combines which includes parts that can be shifted to support a thrasher and header in either of several positions, depending upon the cut that is desired.

With the above and other objects and advantages in view the invention consists of the details of construction arrangement and combination of parts more fully hereinafter described, claimed and illustrated in the accompanying drawings in which:

Figure 1 is a top plan view with parts broken away of an embodiment of the invention.

Figure 2 is a rear view thereof with parts broken away.

Figure 3 is a sectional view on the line 3—3 of Figure 2 with parts broken away.

Figure 4 is a fragmentary sectional view of the motor.

Figure 5 is a front view thereof on the line 5—5 of Figure 4.

Figure 6 is a top plan view of the frame adjusted for a left hand cut combine.

Figure 7 is a top plan view of the frame adjusted for a right hand cut combine.

Figure 8 is a modified form of the invention showing the use of a single wheel for steering the device and Figure 9 is a detailed view of the steering mechanism.

Figure 10 is a horizontal sectional view showing the frame.

Figure 11 is a top plan view of the triangular portion.

Figure 12 is a plan view of the body member.

Figure 13 is a plan view of the brace.

Referring more in detail to the drawings the numeral 10 designates the chassis or frame of the device which comprises the rectangular portion 12, having parallel spaced rail members 11 which are joined at their outer ends by the rectangular wheel enclosing frames 110 and 111 respectively. The frames 110 and 111 are provided longitudinally thereof with relatively spaced openings 112 and bolts 113 secure to the under side of the frames 110 and 111. A removable triangular portion 14 which comprises the straight rail portion 13 having a flanged end 13' and the angular rail portion 130 having the flanged end 131. As shown in Fig. 7 the ends of the rail portions 13 and 130 are secured to the frame 111 by bolts 113. In Fig. 6 these rail portions are secured to the frame 110 by bolts 113. A cross brace 132 being secured to rail portions 13 and 130 by bolts 133. On the apex of the portion 14 there is mounted by means of the flanges 13' and 131 and bolts 134 the running gear 135 for the front steering wheels 16. The frame 10 further includes the substantially triangular portion 18 which supports a thresher not shown. The triangular portion 18 comprises the angular rail members 17 and 17' respectively which are rigidly joined at one end thereof by the brace plate 170. The other end of rail member 17 is connected to wheel enclosing frame 110 (see Fig. 6) by bolts 171, or to frame 111 (see Fig. 7) by bolts 172. Connected to the brace plate 170 is a straight rail member 173 which in Fig. 6 is connected to the frame 110 by bolts 174 and in Fig. 7 is connected to frame 111 by bolts 175. In Fig. 6 the rail member 17' is connected to frame 111 by bolts 176 while in Fig. 7 the rail member 17' is connected to frame 110 by bolts 177. Thus the portions 14 and 18 can be connected as shown in Figures 6 and 7 for a right or left hand cut. Drive wheels 20 are mounted on the housing 22 which extends transversely of the portion 12 within the frames 110 and 111 respectively and a platform 24 is supported directly above the portion 12 by uprights 26. The uprights 26 are fixed at each end of the frames 110 and 111 respectively so that the rail members 23 are directly above the rail members 11 and the rail members 23' provide braces for the members 23. The rail members 23 and 23' form a rectangular platform 24 above the portion 12 and frames 110 and 111.

Mounted on the platform 24 is the heavy duty truck motor 28, which is so arranged that it will drive from both ends; such drive being accomplished through the conventional transmission and through the crank shaft of the motor from the same drive controlling the fan of the motor and the generator thereof. The drive chain or belt 30 connects the crank shaft 32 of the motor 28 with the drive shaft 34 of the clutch 36 which is used to control the thresher and the shaft 34 is provided with a pulley or sprocket 38 over which the chain or belt 30 is trained. The clutch 36 is a standard reversible truck clutch controlled by the handle 40, the bell crank lever 42 and links 44 and 46 respectively connected to the actuating arm 48 of the clutch 36, a toothed segment 50 positions the handle 40 in engaged or disengaged position. The shaft 34 is coupled to the main drive of a combine not shown, and the clutch 36 controls the thresher of the combine. This drive can be easily adapted to either right or left hand cut machines. When the left hand cut is used the frame 10 and other parts are arranged as shown in Figure 7 with the thrasher and header occupying the position shown in broken lines. When a right hand cut desired, the parts are arranged as shown in Figure 6. To move the parts from the position shown in Figure 6 to the position shown in Figure 7, the bolts are removed from the registering openings in the legs 13 and 130 and the frame 10. The triangular portion consisting of the legs 13 and 130 is then turned over and fastened by bolts to the other end of the frame 10. The cross brace 54 is detached from the frame 10, triangular portion, and body member. Similarly, the bolts fastening the body member to the frame 10 are removed and the body member is turned over and the ends of the body member are fastened to the frame by suitable bolt and nut assemblies. Then the brace 54 is arranged as shown in Figure 7 and suitable bolt and nut assemblies are used for again fastening this brace to the body member, frame, and triangular portion. When the parts are arranged as shown in Figure 7, a long shaft 56 is used in place of the short shaft shown in Figure 2. When the parts are to be moved from the position shown in Figure 7 to the position shown in Figure 6, the reverse procedure is followed. Thus, the cross brace 54 is detached, turned over and fastened to the frame. Then, the triangular portion including legs 13 and 14 are detached and fastened to the opposite end of the frame, the body member likewise being secured in the position shown in Figure 6.

The speed of the motor 28 is kept constant by the speed governor 58 and there is no speed change to the thresher but a higher or lower gear may be used on the drive.

The motor 28 drives through a truck clutch 60 and clutch lever 52 and a four speed heavy duty transmission 62 which is provided with the power take off 64. The clutch 60 being controlled by the gear shift lever 66 and the take off by the lever 68 coacting with the segment 70 on the take off housing.

The take off 64 drives the delivering or unloading auger 72 by means of the shaft 74 and universal joint 76. The auger 72 empties the grain from the bulk grain tank 78. This drive is separate from the combine drive or motor drive.

The transmission 62 is connected to the gear reduction unit 80 which transmits the power to the truck drive shaft 82 by a universal joint 84 on the unit 80 and a universal joint 84 to the differential housing 22. The joints are used for flexibility of operation. The differential housing 22 has been extended to approximately twice the conventional size.

As previously stated the device is steered by the front steering wheels 16, which in this instance are two in number, mounted on the truck axle 86 having the usual steering mechanism 88 and rod 90, controlled by the steering wheel 92. Conveniently located near the wheel 92 is the seat 94 for the operator. The device is provided with hydraulic brakes which are controlled by the pedals 96 and brake cylinder 98. A tractor hitch 100 is provided whereby a tractor may be connected thereto for transportation of the device when necessary, e. g., in case the motor should fail or the terrain becomes muddy and the device cannot drive itself. Also on the road the tractor can be used to tow the device.

Regardless of which cut is used the motor and grain bin remain in the same position. The operator's seat is also fixed but the header 102 is reversed as shown in Figures 6 and 7. The header being supported by the link 104, connected to bracket 106, of which there are two—one on each side.

Each of the drive wheels is controlled by a separate brake pedal 96 so that short turns can be made by braking one wheel and using it as a pivot to turn the device.

The grain bin auger using a separate drive can be emptied without the use of the other drives and a pipe 108 connected to the auger delivers the grain as desired.

In Figures 8 and 9 a single steering wheel 110 is used and is controlled by the gear 112 having direct drive therewith and the toothed steering rod 114. In this instance the portion 14 comprises angular rail members 115 and 116 respectively and these members are secured to the frame 110 by bolts 117 and 118 respectively in like manner as previously described.

The device is simple. Most of the moving parts of the drive connections are provided with housings to prevent dust and dirt and damage thereto and the device, using mostly standard automobile parts, is economical to manufacture with no retooling necessary to make the various parts.

It is believed that the operation of the device and its construction will be apparent to those skilled in the art and it is to be understood that minor changes in the details of construction, arrangement and combination of parts may be resorted to without departing from the spirit of the invention or the scope of the appended claim.

Having thus described the invention what is claimed as new and desired to be secured by Letters Patent is:

In combination, a frame including a rectangular portion, said rectangular portion embodying a pair of spaced parallel horizontally disposed rails, and spaced parallel horizontally disposed arms extending between said rails and secured thereto, said arms being provided with a plurality of spaced apertures therein, a substantially triangular portion including a pair of legs secured together at their apex, there being openings in said legs for registering with the apertures in said arms, securing elements extending through said registering apertures and openings for maintaining said portions detachably connected together, front steering wheels mounted on the apex of said triangular portion, drive wheels arranged adjacent each end of said rectangular portions between said pairs of arms, a plurality of vertically disposed spaced parallel uprights extending upwardly from said rectangular portion, a platform supported by said uprights for supporting a motor thereon, a body member including a pair of legs arranged angularly with respect to each other and secured together at their apex, a beam extending from said last named apex, a strip extending angularly from said beam and provided with an offset portion, the legs and offset portion of said strip being provided with a plurality of spaced openings for registering with certain of the apertures in the arms of the frame, and detachable securing elements extending through said last named registering apertures and openings.

WALTER W. WIERSIG.

REFERENCES CITED

The following references are of record in the file of this patent:

UNITED STATES PATENTS

| Number | Name | Date |
|---|---|---|
| 982,480 | Dawson | Jan. 24, 1911 |
| 1,209,209 | Ross | Dec. 19, 1916 |
| 1,308,691 | Williams | July 1, 1919 |
| 2,147,267 | Pierson | Feb. 14, 1939 |
| 2,278,394 | Walters | Mar. 31, 1942 |
| 2,318,409 | Millard et al. | May 4, 1943 |